(12) United States Patent
Makino et al.

(10) Patent No.: US 10,538,943 B2
(45) Date of Patent: Jan. 21, 2020

(54) DOOR LATCH APPARATUS FOR DOOR FOR VEHICLE

(71) Applicant: AISIN SEIKI KABUSHIKI KAISHA, Kariya-shi, Aichi-ken (JP)

(72) Inventors: Sadayuki Makino, Nagoya (JP); Satoshi Shibayama, Nagoya (JP); Yuki Ishiguro, Kariya (JP)

(73) Assignee: AISIN SEIKI KABUSHIKI KAISHA, Kariya-Shi, Aichi (JP)

( * ) Notice: Subject to any disclaimer, the term of this patent is extended or adjusted under 35 U.S.C. 154(b) by 333 days.

(21) Appl. No.: 15/514,296

(22) PCT Filed: Nov. 24, 2015

(86) PCT No.: PCT/JP2015/082891
§ 371 (c)(1),
(2) Date: Mar. 24, 2017

(87) PCT Pub. No.: WO2016/084787
PCT Pub. Date: Jun. 2, 2016

(65) Prior Publication Data
US 2017/0268262 A1 Sep. 21, 2017

(30) Foreign Application Priority Data

Nov. 28, 2014 (JP) .................................. 2014-240924

(51) Int. Cl.
*E05B 77/42* (2014.01)
*E05B 77/34* (2014.01)
(Continued)

(52) U.S. Cl.
CPC ................. *E05B 77/42* (2013.01); *B60J 5/06* (2013.01); *E05B 77/34* (2013.01); *E05B 85/02* (2013.01)

(58) Field of Classification Search
CPC .......... E05B 77/42; E05B 77/34; E05B 81/14; E05B 83/40; E05B 85/02; E05B 77/38;
(Continued)

(56) References Cited

U.S. PATENT DOCUMENTS 5,348,357 A * 9/1994 Konchan ............... E05B 85/243
292/216
6,042,160 A * 3/2000 Hamada .................. E05B 83/16
292/216
(Continued)

FOREIGN PATENT DOCUMENTS

JP H10-068258 3/1998
JP 2011-080251 A 4/2011

OTHER PUBLICATIONS

International Search Report (PCT/ISA/210) dated Mar. 1, 2016, by the Japanese Patent Office as the International Searching Authority for International Application No. PCT/JP2015/082891.
(Continued)

*Primary Examiner* — Nathan Cumar
(74) *Attorney, Agent, or Firm* — Buchanan Ingersoll & Rooney PC (57) ABSTRACT

A door latch apparatus for a door for a vehicle includes a first base member made of metal and including a striker receiving groove, a latch configured to be rotatable about a latch rotary shaft in an engagement direction in which the latch engages with the striker and a disengagement direction where the latch disengages from the striker, a second base member made of metal and arranged to face the first base member with the latch therebetween, the second base member fixed to the first base member, and a load receiving structure receiving an input load when the striker having entered into the striker receiving groove is biased towards the second base member, the load receiving structure receiving the input load with both a first load receiving portion
(Continued)

extended from one base member towards the other base member, and a second load receiving portion provided at the other base member.

6 Claims, 10 Drawing Sheets

(51) Int. Cl.
  *E05B 85/02* (2014.01)
  *B60J 5/06* (2006.01)
(58) Field of Classification Search
  CPC .......... E05B 81/00; E05B 83/42; E05B 83/44; E05B 85/00; B60J 5/06; B60J 5/062; B60J 5/08
  USPC ....................................................... 292/259
  See application file for complete search history.

(56) References Cited

U.S. PATENT DOCUMENTS

| 6,557,913 | B1 * | 5/2003 | Kunst | ..................... | E05B 85/02 |
| | | | | | 292/340 |
| 8,814,228 | B2 * | 8/2014 | Fujiwara | ................ | B60J 5/0433 |
| | | | | | 292/216 |

OTHER PUBLICATIONS

Written Opinion (PCT/ISA/237) dated Mar. 1, 2016, by the Japanese Patent Office as the International Searching Authority for International Application No. PCT/JP2015/082891.

* cited by examiner

DOOR LATCH APPARATUS FOR DOOR FOR VEHICLE

TECHNICAL FIELD

The invention is related to a door latch apparatus to be mounted on a door for a vehicle.

BACKGROUND ART

Patent document 1 which will be described later discloses an example of a door latch apparatus of this kind. According to the door latch apparatus, component elements are assembled between a first base member (a base plate) made of metal and a second base member (a cover plate) made of mental. The first base member includes a striker receiving groove formed to provide an opening for receiving a striker.

DOCUMENT OF PRIOR ART

Patent Document

Patent document 1: JP2011-80251A

OVERVIEW OF INVENTION (Problem to be solved by the invention) According to the above-mentioned door latch apparatus, it is assumed that the striker which is in a state of having entered the striker receiving groove of the first base member may be biased in a direction (a direction towards the second base member) intersecting an entering direction. Thus, a structure is needed for receiving an input load inputted from the striker in the above-mentioned case. Conventionally, a structure is generally applied in which a plate thickness of the second base member is increased to enhance strength and the input load from the striker is received by the second base member. According to such a structure, however, the plate thickness of the entire second base member is increased, thereby increasing weight of and costs the door latch apparatus.

The invention is made in consideration of the above-mentioned aspect and a purpose thereof is to provide, at a door latch apparatus to be mounted on a door for a vehicle, a technique which is effective for receiving an input load from a striker without increasing weight of the apparatus more than necessary.

(Means for solving problem) To achieve the above-mentioned purpose, a door latch apparatus for a door for a vehicle related to the invention includes a first base member, a latch, a second base member and a load receiving structure. The first base member is a member made of metal and including a striker receiving groove configured such that a striker enters into the striker receiving groove. The latch is configured to be rotatable in two directions about a latch rotary shaft attached to the first base member, the two directions corresponding to an engagement direction in which the latch engages with the striker and a disengagement direction in which the latch disengages from the striker. The second base member is a member made of metal and arranged to face the first base member with the latch interposed therebetween, the second base member being fixed to the first base member. The load receiving structure has a function of receiving an input load in a case where the striker having entered into the striker receiving groove of the first base member is biased towards the second base member, the load receiving structure receiving the input load with both a first load receiving portion extended from one base member of the first base member and the second base member towards the other base member, and a second load receiving portion provided at the other base member. According to the load receiving structure, the input load from the striker is received efficiently, while strength of each of the first load receiving portion of the one base member and the second load receiving portion of the other base member is complemented or supplemented. As a result, the input load from the striker can be received without increasing weight of the apparatus more than necessary which attributes to weights of the first base member and/or the second base member.

At the door latch apparatus including the above-described structure, it is desirable that the load receiving structure is configured such that the first load receiving portion of the one base member and the second load receiving portion of the other base member are not connected to each other, and that each of the load receiving portions faces the striker that is in a state of having entered into the striker receiving groove. In this case, a structure for connecting the first load receiving portion and the second load receiving portion to each other is not required, and thus the other base member is easily assembled on the one base member. In addition, it is also advantageous in weight reduction.

At the door latch apparatus including the above-described structure, it is desirable that the load receiving structure is configured such that strength of the first load receiving portion of the first base member serving as the one base member exceeds strength of the second load receiving portion of the second base member serving as the other base member, and such that the load receiving structure comes into contact with the first load receiving portion prior to the second load receiving portion in a case where the striker which is in a state of having entered into the striker receiving groove is biased towards the second base member. In this case, because the input load from the striker is dispersed at the first load receiving portion first, the input load is prevented from extending to the second load receiving portion. Even in a case where the first load receiving portion is deformed by the input load from the striker and the load reaches the second load receiving portion from the striker, a level of the load can be reduced low. As a result, the second base member including the second load receiving portion can be reduced in size without decreasing the strength against the striker, which enables weight reduction and cost reduction of the door latch apparatus.

At the door latch apparatus including the above-described structure, it is desirable that the first load receiving portion is configured as a plate portion formed in an arch shape and including two extended pieces which are extended respectively from two different base end region of the first base member and defines an entering space for the striker, and a connection piece connecting extended ends of the respective two extended pieces to each other. Accordingly, with the simple structure, weight of the first load receiving portion can be reduced while necessary strength at the first load receiving portion is ensured.

At the door latch apparatus including the above-described structure, it is desirable that the first base member includes a drawing portion at a portion which is at an outer side of the entering space and is adjacent to the extended piece. The drawing portion is a portion formed when the first base member is formed by drawing press work. Accordingly, the strength of the first load receiving portion configured as the plate portion formed in the arch shape can be enhanced even more.

At the door latch apparatus including the above-described structure, it is desirable that, in a case where the door for the vehicle is closed, the first load receiving portion is configured to extend along a panel-extended-surface of a vehicle body panel at which the door for the vehicle is fitted. Accordingly, a structure can be realized in which, for example, dust and/or water is less likely to enter a vehicle inside from a gap between the door latch apparatus and the vehicle body panel.

EFFECT OF THE INVENTION

As described above, according to the invention, at the door latch apparatus which is to be mounted on a door for a vehicle, an input load from a striker can be received without increasing weight of the apparatus beyond necessity.

MODE FOR CARRYING OUT THE INVENTION

An embodiment of the invention will be described with reference to plural drawings. In these drawings, a vehicle front direction and a vehicle rear direction are indicated with an arrow X1 and an arrow X2, respectively. A vehicle left direction and a vehicle right direction are indicated with an arrow Y1 and an arrow Y2, respectively. A vehicle upper direction and a vehicle lower direction are indicated with an arrow Z1 and an arrow Z2, respectively. These directions are applicable to a door latch apparatus before being mounted on a vehicle door and to the door latch apparatus after being mounted on the vehicle door. In addition, in this description or specification, an action of, a predetermined element, of rotating about a shaft or axis is described simply as "rotate" or "turn" regardless of an amount of the action. However, the action can be described also as "pivot", "move in a tilting manner" when needed.

Figure 1:
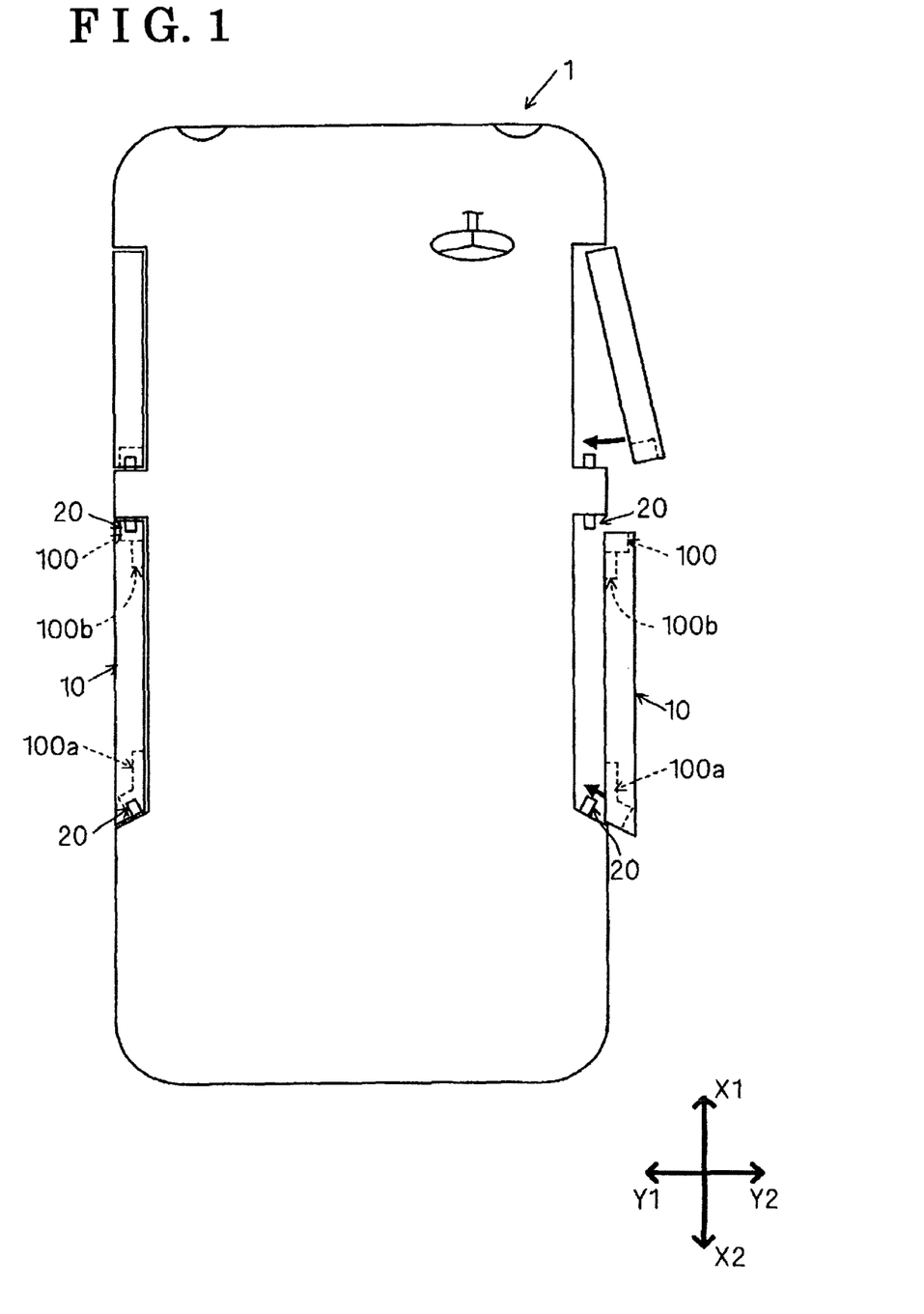
FIG. 1 is a plan view illustrating a schematic configuration of a vehicle 1 including a vehicle door 10 which is a sliding type door.

A vehicle 1 illustrated in FIG. 1 includes a vehicle door 10 of a sliding type, which corresponds to a vehicle rear seat (the vehicle door 10 will be referred to also as "a door for a vehicle" or "a sliding door"). The vehicle door 10 is configured to be operable between a fully-closed state in which an entrance for ingress and egress of an occupant is fully closed and a fully-open state in which the entrance is open so that an opening area of the entrance is maximized. The vehicle door 10 moves in an obliquely rear direction from the fully-closed state, and during the movement, the vehicle door 10 moves straightly in a rear direction, and then comes to be in the fully-open state. On the vehicle door 10, plural component elements including a first door latch apparatus 100, a second door latch apparatus 100a and a third door latch apparatus 100b, are assembled. Each of the first door latch apparatus 100 and the second door latch apparatus 100a performs a function of holding the vehicle door 10 in a closed state. The third door latch apparatus 100b performs a function of holding the vehicle door 10 at the fully-open state. A striker 20 corresponding to each of the three door latch apparatuses 100, 100a and 100b is provided at a door frame of a vehicle main body.

Figure 2:
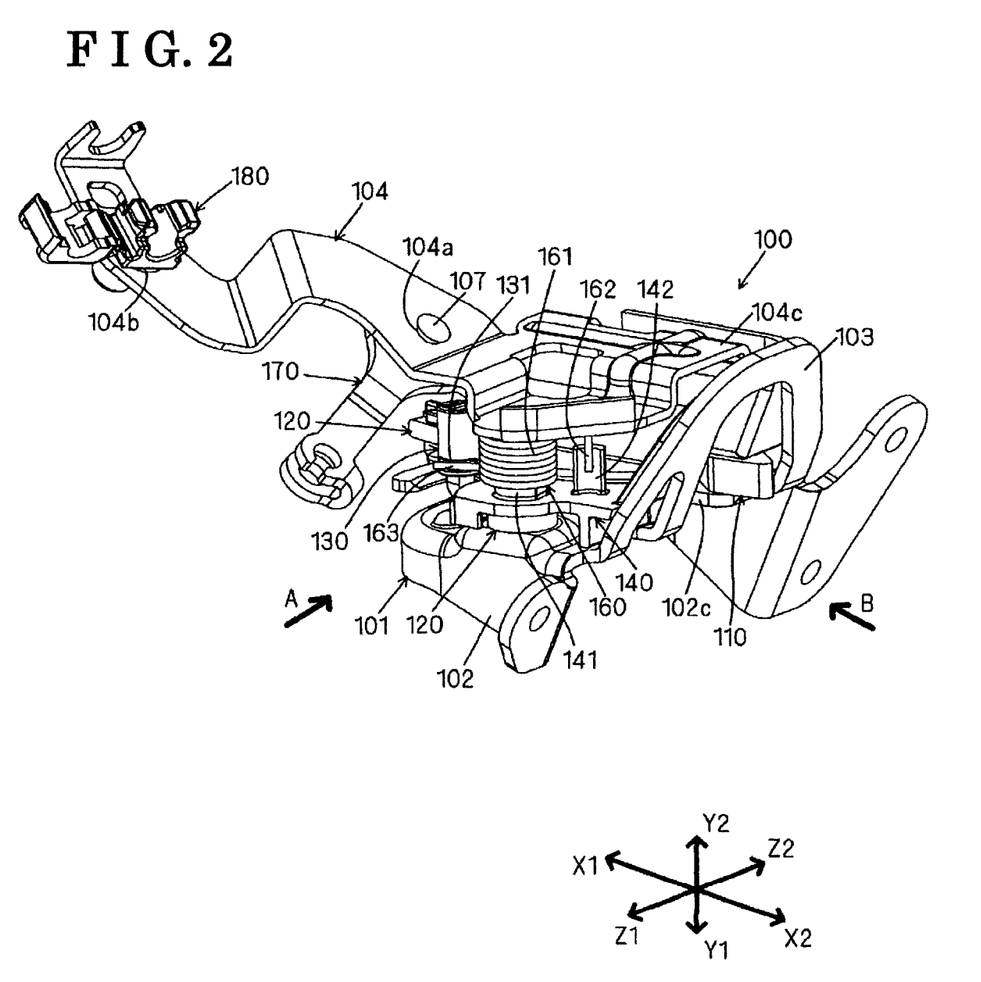
FIG. 2 is a perspective view of a first door latch apparatus 100 to be mounted on the vehicle door 10 of FIG. 1.
Figure 3:
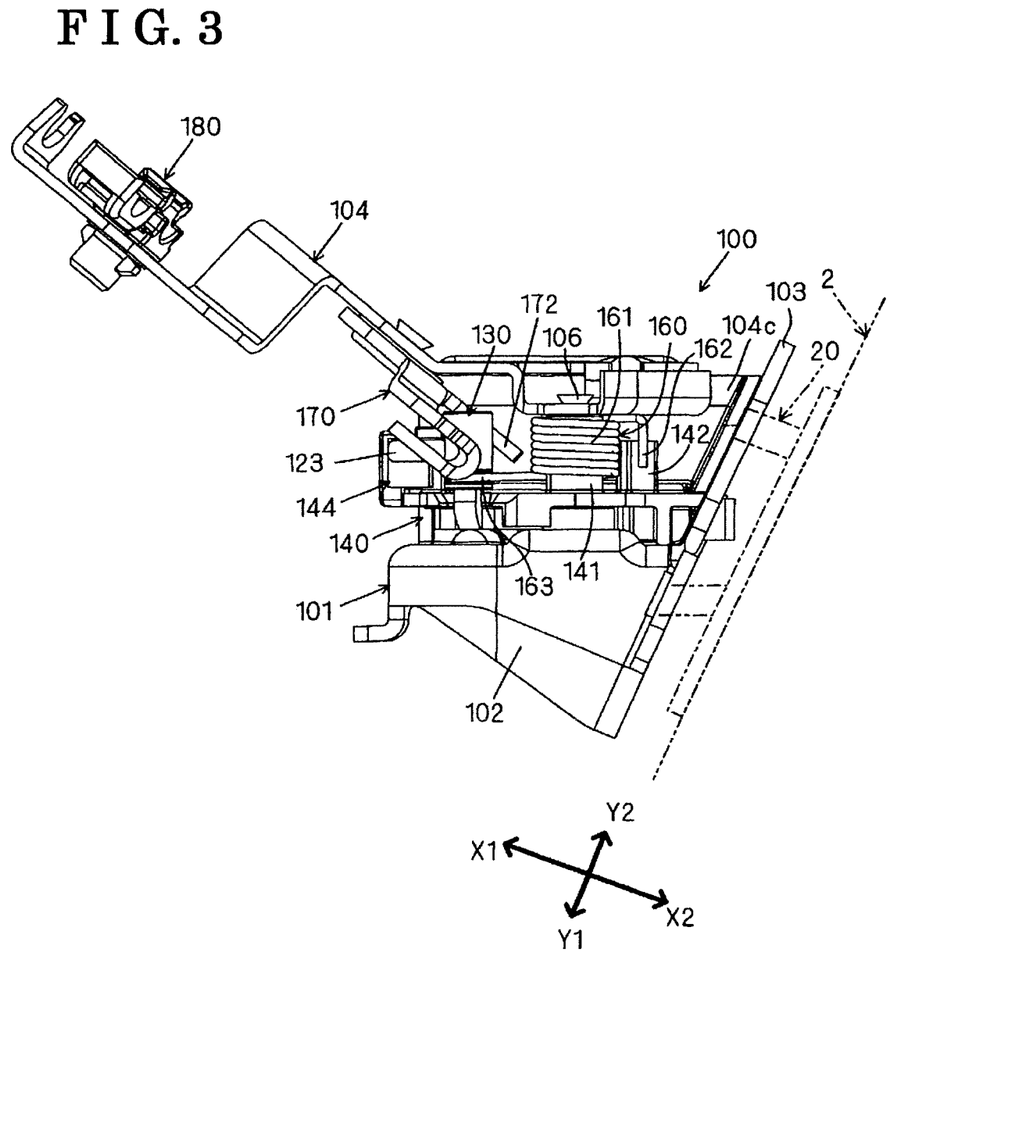
FIG. 3 is a diagram of the first door latch apparatus 100 of FIG. 2, which is seen from a direction of an arrow A.
Figure 4:
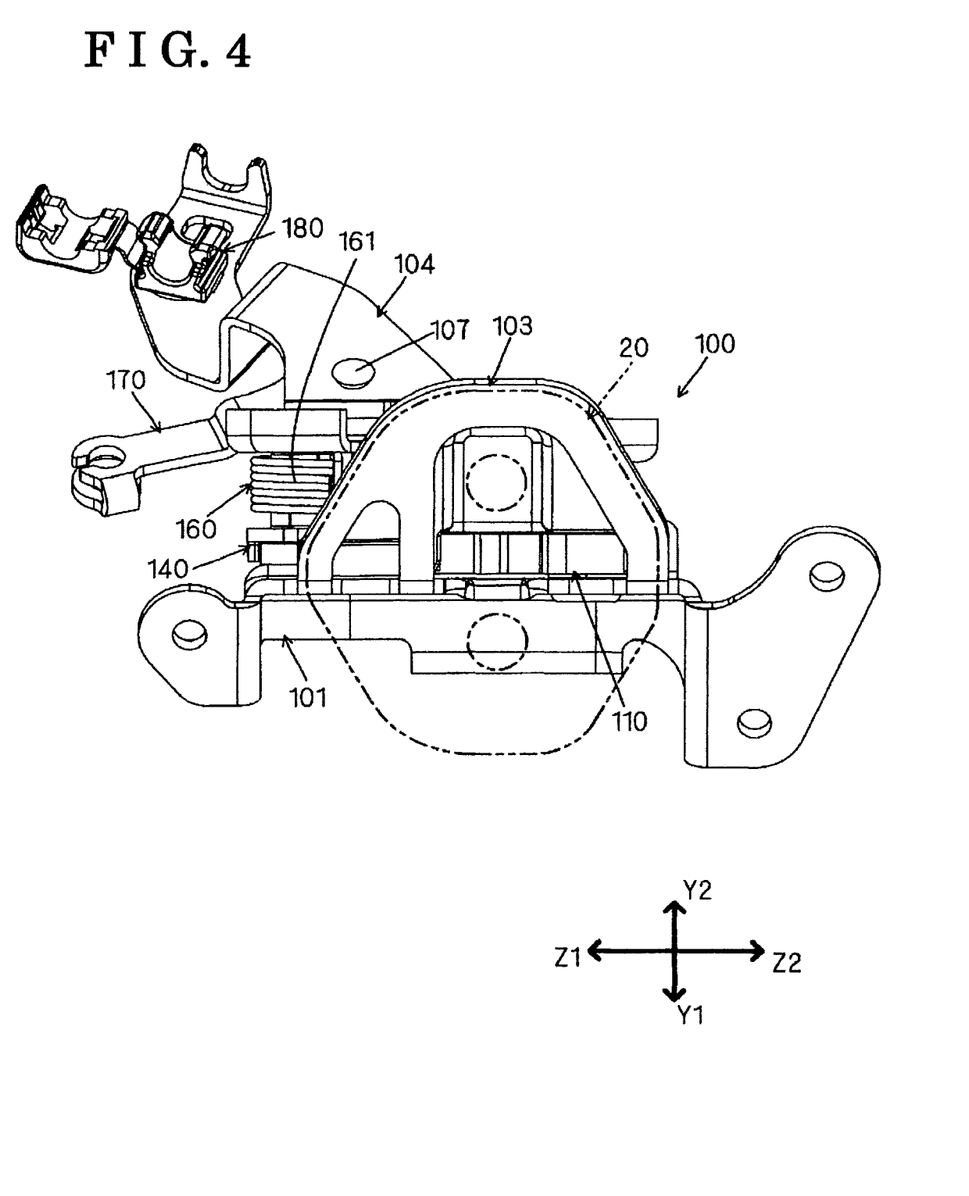
FIG. 4 is a diagram of the first door latch apparatus 100 of FIG. 2, which is seen from a direction of an arrow B.

As illustrated in FIGS. 2 to 4, the first door latch apparatus (which will be hereinafter simply referred to also as "door latch apparatus") 100 is for setting the vehicle door 10 to a close-hold state (a state in which the vehicle door 10 is closed and held) and a close-hold-released state (a state in which the close-hold state of the vehicle door 10 is released). The door latch apparatus 100 includes a first base member 101 and a second base member 104, both of which are made of metal. Further, plural component elements (for example, a latch 110 and a pawl 120, which will be described later) are assembled between the first base member 101 and the second base member 104. In this case, the second base member 104 is arranged to face the first base member 101 with the plural component elements interposed therebetween, and is connected to the first base member 101 via pins 105 and 106 which will be described later.

Figure 5:
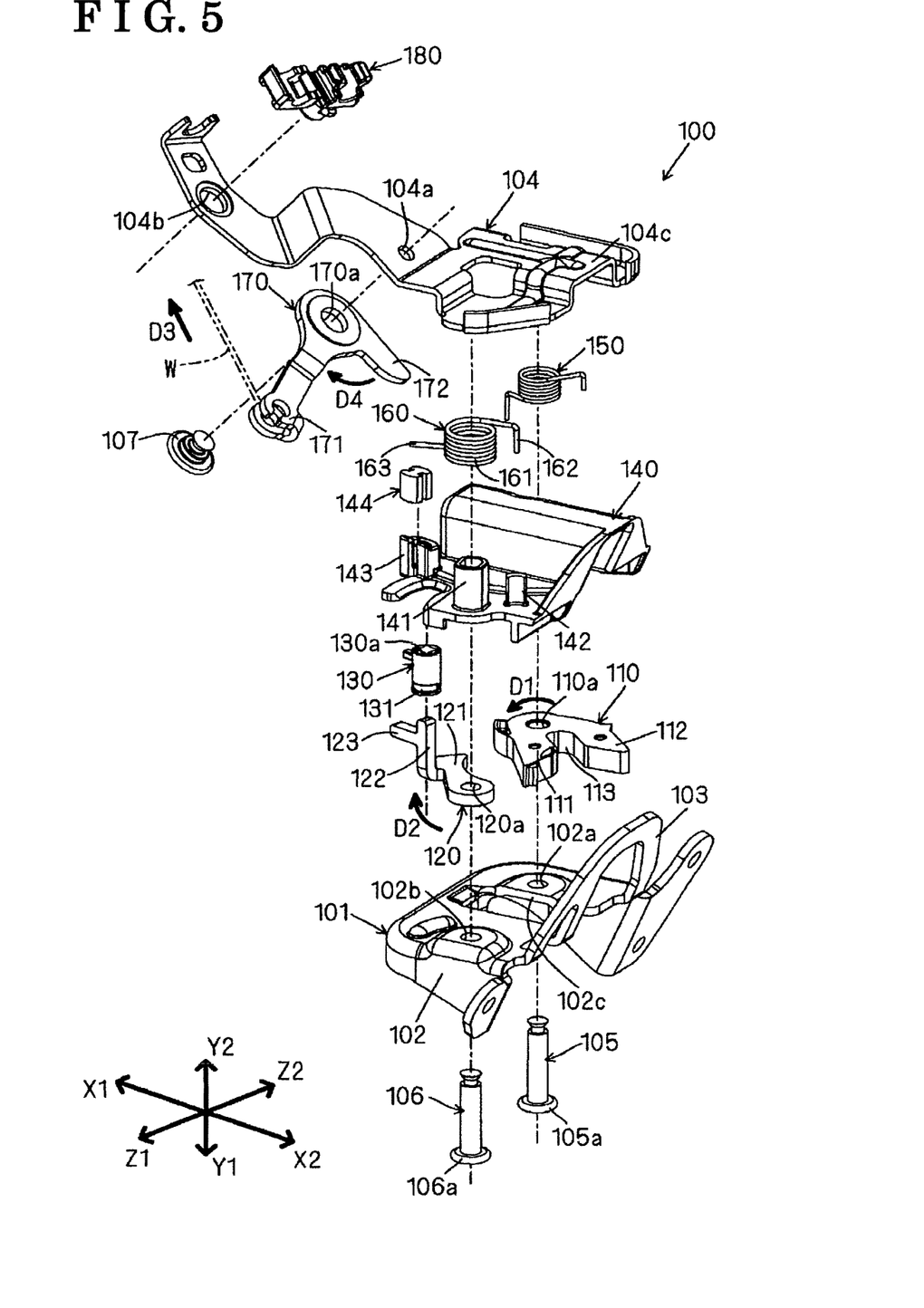
FIG. 5 is an exploded perspective view of the first door latch apparatus 100 of FIG. 2.

In addition to FIGS. 2 to 4, as FIG. 5 is referred to, the first base member 101 is a member formed in a plate shape and including a substantially uniform plate thickness. The first base member 101 includes a base main body portion 102 and a first load receiving portion (which will be hereinafter referred to also as "a reinforced portion") 103 extended from the base main body portion 102. The first base member 101 corresponds to "one base member" and "the first base member" of the invention, and the first load receiving portion 103 of the first base member 101 corresponds to "the first load receiving portion" of the invention. The base main body portion 102 of the first base member 101 includes a through hole 102a formed in a penetrating manner so that the latch pin (which is referred to also as "a latch rotary shaft") 105 including a shaft shape is attached to the through hole 102a, a through hole 102b which is formed in a penetrating manner so that a pawl pin (which is referred to also as "a pawl rotary shaft") 106 including a shaft shape is attached to the through hole 102b, and a striker receiving groove 102c into which the striker 20 can enter. The first load receiving portion 103 is extended from the first base member 101 towards the second base member 104, and is configured as the load receiving portion (which will be hereinafter referred to as "the first load receiving portion") receiving a load in a lateral direction which is received from the striker 20 that is in a state of having entered the striker receiving groove 102c, that is, a load working in the vehicle right direction Y2 of FIG. 5. The second base member 104 is a member formed in a plate shape and including a substantially uniform plate thickness. The second base member 104 includes a second load receiving portion 104c receiving the load in the lateral direction which is received from the striker 20 that is in a state of having entered the striker receiving groove 102c, similarly to the first load receiving portion 103. The second base member 104 corresponds to "the other base member" and "the second base member" of the invention, and the second load receiving portion 104c of the second base member 104 corresponds to "the second load receiving portion" of the invention. That is, the door latch apparatus 100 of the embodiment includes a load receiving structure where the input load, which occurs when the striker 20 in a state of having entered the striker receiving groove 102c is biased towards the second base member 104, is received by both the first load receiving portion 103 and the second load receiving portion 104c. According to the load receiving structure, the input load from the striker 20 can be received efficiently, while strength of the first load receiving portion 103 of the first base member 101 and the strength of the second load receiving portion 104c of the second base member 104 are complemented or supplemented. As a result, the input load from the striker 20 can be received without increasing weight of the apparatus more than necessary, which attributes to weights of the first base member 101 and/or the second base member 104.

It is desirable that the latch pin 105 and the pawl pin 16 include the same shape. Thus, the same pin member can be used. It is desirable that the pins 105 and 106 include flange portions 105a and 106a, respectively, each of which includes a flange shape and is provided at one axial end. In this case, a direction of assembling of the pins 105 and 106 relative to the base main body portion 102 of the first base member 101 is determined to one direction, and thus an assembling performance of the pins 105 and 106 is enhanced.

The second base member 104 includes attachment holes 104a and 104b which are formed in penetrating manners. The second base member 104 and an open lever 170 are connected to each other to be relatively rotatable, with the use of an open lever pin 107 inserted in both the attachment hole 104a of the second base member 104 and an attachment hole 170a of the open lever 170. Thus, the open lever 170 is configured to be rotatable about the open lever pin 107 relative to the second base member 104. The open lever 170 is a metal member including a first arm portion 171 to which an end portion of an open cable W is connected, and a second arm portion 172 indirectly engaging with the pawl 120 that will be describe later via a cap 130 formed by resin material. A cable clamp 180 for clamping a coating portion coating or covering the open cable W is attached to the attachment hole 104b of the second base member 104.

The latch pin 105 provided at the base main body portion 102 of the first base member 101 is inserted into an insertion hole 110a of the latch 110. Accordingly, the latch 110 is rotatably supported by the latch pin 105 and is configured to be rotatable about the latch pin 105 in both an engagement direction in which the latch 110 engages with the striker 20 provided at the vehicle body and a disengagement direction in which the latch 110 disengages from the striker 20. The latch 110 is set to plural positions including an unlatch position, a full latch position, and a half latch position which is between the unlatch position and the full latch position. The latch 110 includes a first engagement portion 111 and a second engagement portion 112 which are extended substantially parallel with each other, and a region in which the first engagement portion 111 and the second engagement portion 112 face each other is configured as a striker receiving portion 113 for receiving therein the striker 20. The latch 110 is elastically biased in an unlatch direction (a direction indicated with an arrow D1 of FIG. 5) towards the unlatch position by a coil spring (an elastic spring member) 150 which is formed in a coil shape and is made from metal material including a shape of line. The latch 110 corresponds to "the latch" of the invention.

The striker 20, which has entered the striker receiving groove 102c of the first base material 101 when the vehicle door 10 is closed, enters the striker receiving portion 113 while pushing a facing surface of the first engagement portion 111 of the latch 110, the facing surface which is at the side of the striker receiving portion 113. Accordingly, in a case where the vehicle door 10 is closed, the latch 110 engages with the striker 20 and rotates about the latch pin 105 from the unlatch position in the engagement direction (a direction opposite to the direction indicated with the arrow D1 of FIG. 5). That is, the latch 110 rotates in a lock direction in which the engagement with the striker 20 is deepened and is locked.

The pawl pin 106 provided at the base main body portion 102 of the first base member 101 is inserted in an insertion hole 120a of the pawl 120. Thus, the pawl 120 is rotatably supported by the pawl pin 106. The pawl 120 includes an extended portion 121 extended towards the latch 110, and is configured to be rotatable about the pawl pin 106 between a restriction position and a non-restriction position. In the restriction position, the rotation of the latch 110 in the disengagement direction relative to the striker 20 is restricted by the extended portion 121. In the non-restriction position, the rotation of the latch 110 in the disengagement direction relative to the striker 20 is not restricted. The pawl 120 is elastically biased in a direction indicated with an arrow D2 of FIG. 5 from the non-restriction position towards the restriction position, by a coil spring (an elastic spring member) 160 which is formed in a coil shape and is made from metal material including a shape of line.

The pawl 120 further includes an attachment shaft 122 extended in a form of a shaft in a predetermined direction to hold the cap 130 made of resin, and a pawl engagement portion 123 extended from the attachment shaft 122 and engaging with a pawl stopper 144 of a holding member 140 which will be described later. The cap 130 is formed in a cylindrical shape. The attachment shaft 122 is arranged in an in-cylinder space 130a of the cap 130 in an inserted condition, and thus the cap 130 is held relative to the pawl 120 integrally with the pawl 120. For this purpose, it is desirable that the attachment shaft 122 includes a columnar configuration of which a cross-sectional shape is rectangular, and that the in-cylinder space 130a is configured to include a cross-sectional shape that is same as the cross-sectional shape of the attachment shaft 122. The cap 130 includes a spring engagement groove 131 formed at an outer surface thereof and including a recessed configuration.

The holding member 140 made of resin and configured to cover the latch 110 and the pawl 120 is assembled between the first base member 101 and the second base member 104. The holding member 140 includes a boss portion 141 including a cylindrical shape extending in a direction same as the attachment shaft 122, in order to hold a coil portion 161 of the coil spring 160, the coil portion 161 of which a cross-sectional shape is circular. The holding member 140 includes a spring lock portion 142 for locking a spring end portion 162 of one spring line extended radially outwardly from the coil portion 161 held by the boss portion 141. The holding member 140 includes a stopper holding portion 143 holding the pawl stopper 144 made from a rubber material.

The coil spring 160 is configured such that a spring end portion 163 of the other spring line extended radially outwardly from the coil portion 161 held by the boss portion 141 engages with the spring engagement groove 131 of the cap 130. In this case, the cap 130 inserted at the attachment shaft 122 of the pawl 120 can be prevented, by the spring end portion 163 of the coil spring 160, from coming off from the attachment shaft 122. On the other hand, the pawl pin 106 inserted in the insertion hole 120*a* of the pawl 120 is clinched and fastened to the second base material 104 at a shaft end of the side opposite to the flange portion 105*a* in a state where the pawl pin 106 is inserted in the cylinder of the boss portion 141.

As a consequence, the coil spring 160 is restricted from moving in a coming-off direction (an axial direction of the attachment shaft 122) by the second base member 140 so that the coil portion 161 of the coil spring 160 does not come off from the boss portion 141 of the holding member 140. That is, the coil spring 160 is assembled on the holding member 140 in a state where the coil spring 160 is restricted from moving in the axial direction of the attachment shaft 122. Eventually, the cap 130 is prevented from coming off from the attachment shaft 122 of the pawl 120. In this case, the coming-off prevention of the cap 130 is performed indirectly by the second base material 104 which restricts the coil spring 160 from coming off from the boss portion 141. That is, a coming-off prevention mechanism preventing the cap 130 from coming off from the attachment shaft 122 of the pawl 120 is configured in cooperation among the holding portion 140 restricting the coil spring 160 from coming off the boss portion 141, the spring engagement groove 131 of the cap 130, and the spring end portion 163 engaged in the spring engagement groove 131. According to the coming-off prevention mechanism, the cap 130 attached to the pawl 120 can be retained so as not to come off and not to be separated, and therefore operational reliability of the open lever 170 can be assured. In addition, the existing coil spring 160 allocated to the pawl 120 is utilized to hold the cap 130, and thus there is no need to provide an exclusive member, which is advantageous from an aspect of costs. In particular, the coming-off prevention of the cap 130 can be performed with the simple structure utilizing the engagement of the spring end portion 163 of the one spring line extended from the coil portion 161 of the coil spring 160 and the spring engagement groove 131 of the cap 130 with each other. Also the latch pin 105 is clinched and fastened to the second base member 104 in a similar manner, and accordingly the coil spring 150 is restricted from moving in a coming-off direction of the coil spring 150 by the second base member 140, which is not specifically shown.

At the door latch apparatus 100 including the above-described configuration, when the open cable W is pulled in a direction indicated with an arrow D3 of FIG. 5 in response to an opening operation of the vehicle door 10, the open lever 170 rotates about the open lever pin 107 in a direction indicated with an arrow D4 of FIG. 5. At this time, the second arm portion 172 of the open lever 170 engages indirectly with the attachment shaft 122 in a state where the second arm portion 172 is in contact with an outer surface (an arc surface) of the resin cap 130, and the second arm portion 172 biases, via the cap 130, the pawl 120 to rotate the pawl 120 in a direction opposite to the direction indicated with the arrow D2 of FIG. 5 from the restriction position to the non-restriction position, against the elastic biasing force of the coil spring 160. Accordingly, the pawl 120 is set at the non-restriction position at which the latch 110 is not restricted from rotating in the disengagement direction relative to the striker 20. In this case, since the second arm portion 172 of the metal open lever 170 engages indirectly with the metal pawl 120 via the resin cap 130, a sliding resistance of the open lever 170 is reduced and the open lever 170 can be operated smoothly, compared to a case where the second arm portion 172 of the open lever 170 which is made of metal engages directly with the metal pawl 120.

Figure 6:
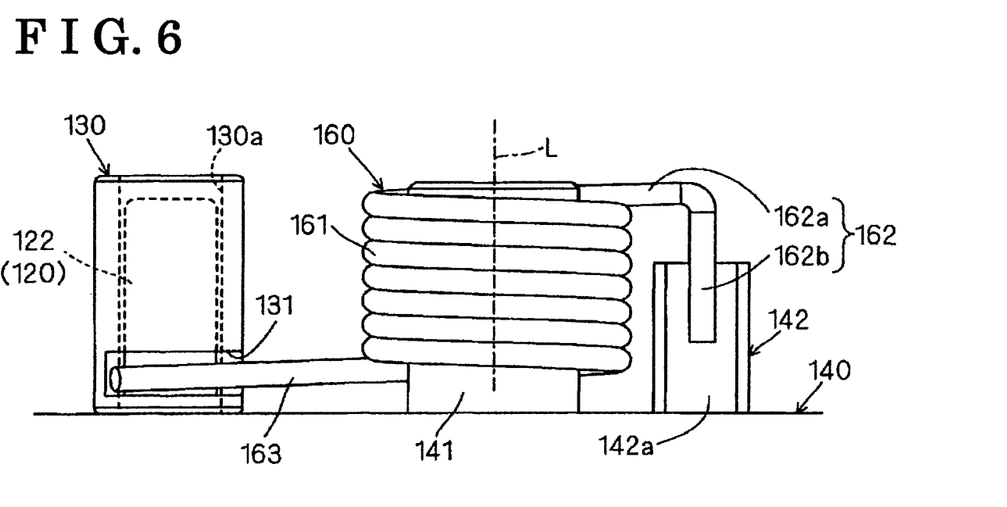
FIG. 6 is a diagram illustrating a coil spring 160 constituting the first door latch apparatus 100 and a peripheral configuration thereof.
Figure 7:
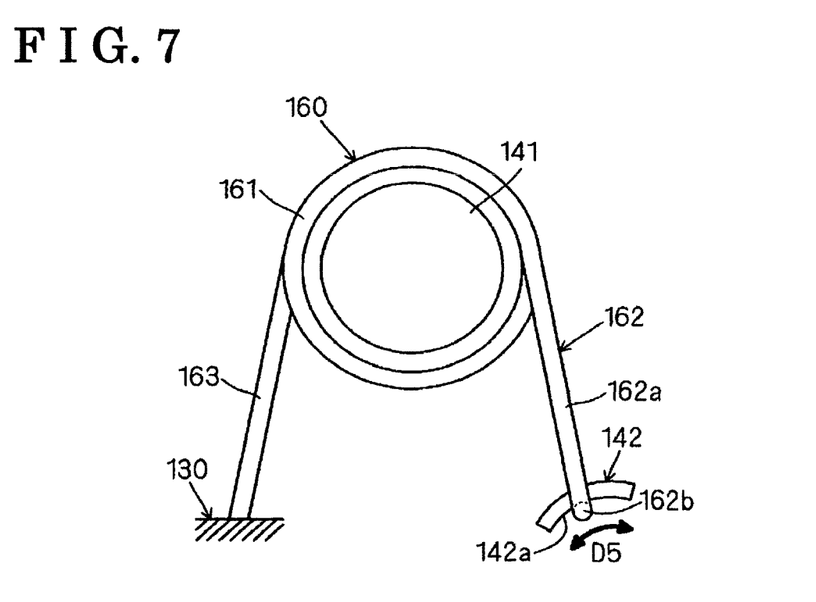
FIG. 7 is a diagram for explaining a function of a spring lock portion 142 of a holding member 140.

Here, a structure related to the coil spring 160 will be described with reference to FIGS. 6 to 8.

As described above, at the coil spring 160, the one spring end portion 162 extended from the coil portion 161 is locked at the spring lock portion 142 of the second base member 104. More specifically, as illustrated in FIG. 6, the spring end portion 162 is formed of a first region 162*a* which is extended radially outwardly from the coil portion 161 including a circular cross section and is extended linearly, and a second region 162*b* bent from the first region 162*a* and extended linearly. The second region 162*b* engages with a lock surface 142*a* of the spring lock portion 142. The second region 162*b* of the spring end portion 162 is extended in the same direction as a coil center line L of the coil portion 161 (refer to FIG. 6).

Consequently, before the open lever 170 operates, part of an elastic load of the coil sparing 160 works on the spring lock portion 142 via the spring end portion 162. The lock surface 142*a* of the spring lock portion 142 is a curved surface curved along a circumferential direction of the second region 162*b* of the spring end portion 162 including the circular cross section. Thus, as illustrated in FIG. 7, the second region 162*b* of the spring end portion 162 of the coil spring 160 is capable of moving in a direction indicated with an arrow D5 on the lock surface 142*a* along the curved surface in response to elasticity of the coil spring 160 in a state where a circumferential surface of the second region 162*b* is in plane-to-plane contact with the lock surface 142*a* of the spring lock portion 142. As a result, the second region 162*b* of the spring end portion 162 moves freely along the lock surface 142*a* of the spring lock portion 142 when the coil spring 160 is assembled on the holding member 140, and thus an assembling error can be absorbed.

To return to FIG. 6, the other spring end portion 163, which is part of the coil spring 160, is a member extended linearly in the radially outward direction from the coil portion 161 including the circular cross section. The spring end portion 163 engages with the spring engagement groove 131 of the cap 130 and is in contact with the attachment shaft 122 of the pawl 120. That is, part of the attachment shaft 122 is exposed to a groove bottom of the spring engagement groove 131. Accordingly, before the open lever 170 operates, the pawl 120 is held at the restriction position in a state where the pawl 120 receives the elastic load from the coil spring 160 because the pawl engagement portion 123 provided at the attachment shaft 122 is in contact with the pawl stopper 144 provided at the holding member 140. In this case, part of the elastic load of the coil spring 160 works on the attachment shaft 122 via the spring end portion 163 and the elastic load working on the attachment shaft 122 is received by the pawl stopper 144 that is in contact with the pawl engagement portion 123.

Figure 8:
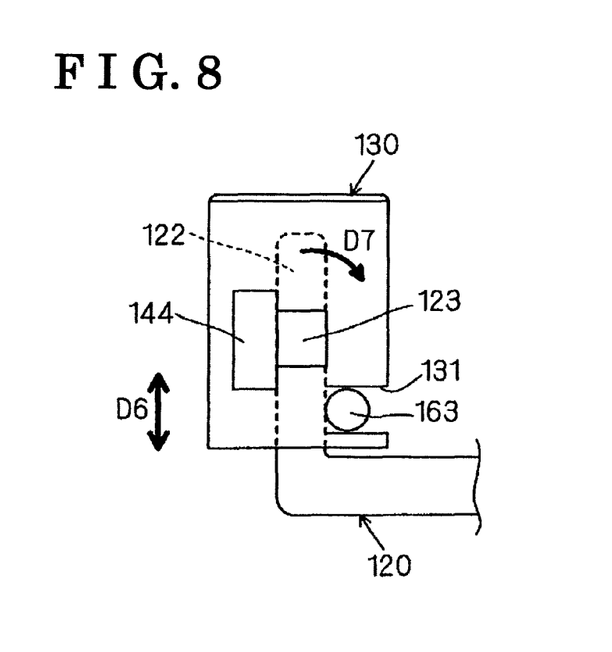
FIG. 8 is a diagram for explaining characteristics of a cap 130.

At this time, as FIG. 8 is referred to, it is desirable that the spring engagement groove 131 with which the spring end portion 163 engages and the pawl engagement portion 123 are set at positions which are close to each other with respect to an elongated direction of the attachment shaft 22 (the axial direction indicated with an arrow D6 of FIG. 8). Thus, due to the elastic load received from the spring end portion 163 of the coil spring 160, the attachment shaft 122 of the pawl 120 can reduce a rotational moment in a direction indicated with an arrow D7 which is received when the pawl engagement portion 123 is in contact with the pawl stopper 144. As a result, the occurrence of looseness or rattle at the pawl 120 can be reduced.

A load inputted from the second arm portion 172 during the operation of the open lever of 170 is transmitted to the attachment shaft 122 via the cap 130, and then is further transmitted from the attachment shaft 122 directly to the spring end portion 163 engaged with the spring engagement groove 131 of the cap 130. Instead of the configuration in which the part of the attachment shaft 122 is exposed to the groove bottom of the spring engagement groove 131, a configuration may be applied in which the attachment shaft 122 is not exposed to the groove bottom of the spring engagement groove 131. In a case of this configuration, the load inputted from the second arm portion 172 of the open lever 170 is transmitted from the attachment shaft 122 indirectly to the spring end portion 163 engaged with the spring engagement groove 131 of the cap 130, via a resin portion of the spring engagement groove 131.

Figure 9:
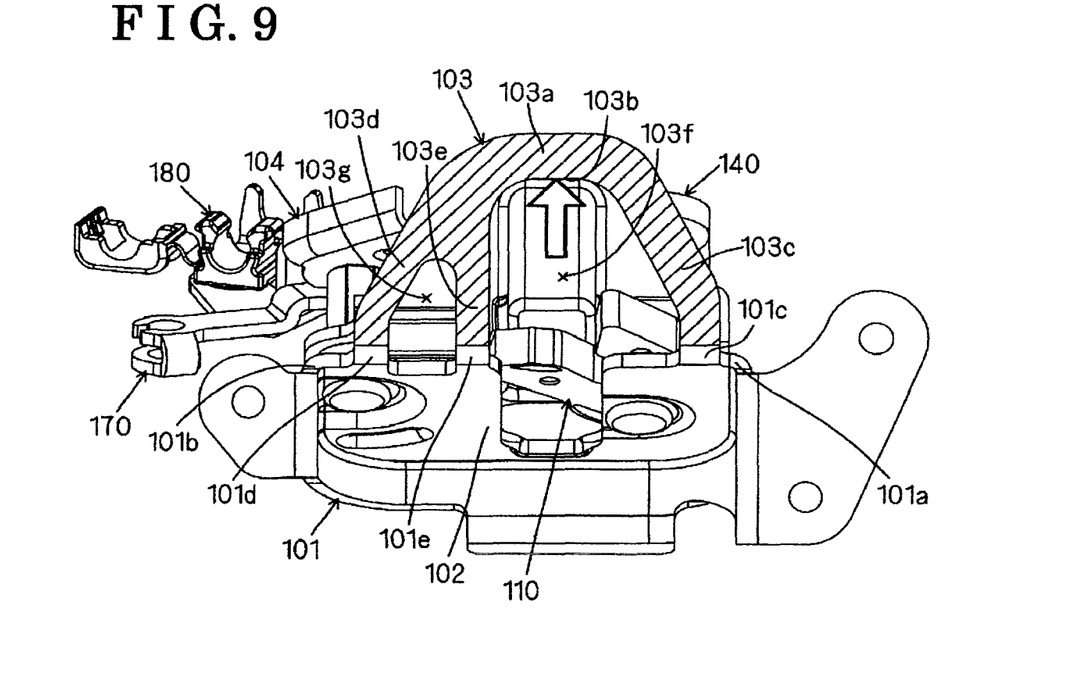
FIG. 9 is a diagram for explaining a configuration of a first load receiving portion 103 of a first base member 101.
Figure 10:
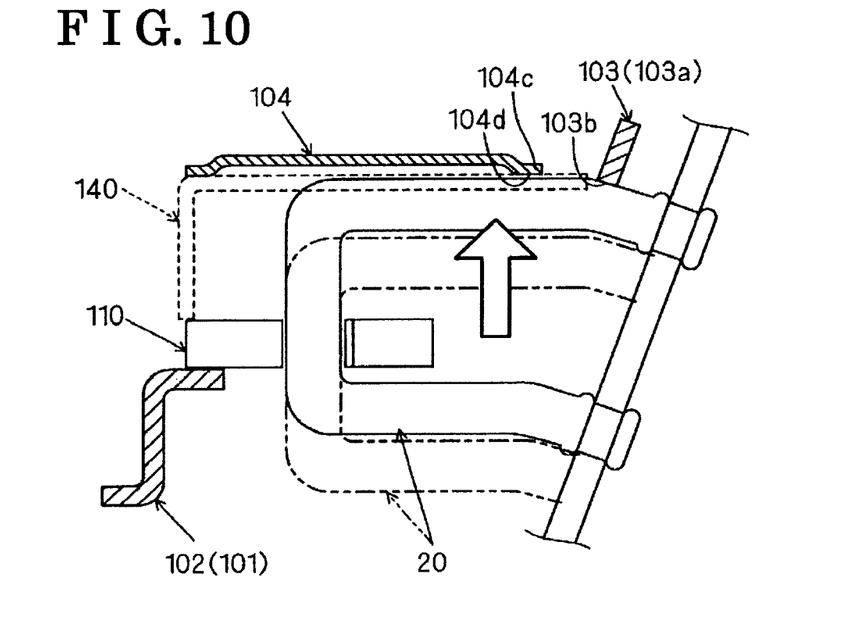
FIG. 10 is a diagram for explaining a function of the first load receiving portion 103 of FIG. 9.

Here, the first load receiving portion 103 of the first base member 101 will be described with reference to FIGS. 9 and 10. In these drawings and other drawings related to modifications thereof, hatching is applied to a surface of the first load receiving portion such that a shape and configuration of the first load receiving portion is clarified. The first load receiving portion 103 of the embodiment is a portion including the plate shape extended along a panel-extended-surface of a vehicle body panel where the vehicle door 10 is fitted when the vehicle door 10 is closed (a vehicle body panel 2 of FIG. 3). In this case, it is difficult for, for example, dust and/or water to enter the vehicle cabin from a gap between the door latch apparatus 100 and the vehicle body panel 2. At the first load receiving portion 103, a connection piece 103a and three extended pieces 103c, 103d and 103e are integrated to one another, and each of the pieces is configured such that a plate width exceeds a plate thickness.

The connection piece 103a is a portion that can be in contact with the striker 20 at an inner wall surface (a surface corresponding to the plate thickness) 103b so as to receive the load in a direction (a direction indicated with an outlined arrow of FIG. 9) in which the striker 20 faces towards the second base member 104. The three extended pieces 103c, 103d and 103e are extended from base end regions 101c, 101d and 101e of the base main body portion 102, respectively, towards the connection piece 103a. The base end regions 101c, 101d and 101e are different regions from each other. Extended ends of the three extended pieces 103c, 103d and 103e are connected to one another by the connection piece 103a. In this case, the first load receiving portion 103 forms a plate portion including an arch shape (which is referred to also as "a shape of a letter U" or "a shape of a hook") together with the connection piece 103a and the two extended pieces 103c and 103d. A space portion 103f defined by the extended piece 103c and the extended piece 103e serves as an entering space for the striker 20 to enter.

A space portion 103g defined by the extended piece 103d and the extended piece 103e serves as an opening region for reducing weight of the first load receiving portion 103. Thus, with the simple configuration, a desired strength required of the first load receiving portion 103 can be ensured, while the weight of the first load receiving portion 103 is reduced. In this case, it is desirable that a length of the connection piece 103a (a length in the right and left direction in FIG. 9) falls below a distance between the base end region 101c of the extended piece 103c and the base end region 101d of the extended piece 103d. Thus, the weight of the first load receiving portion 103 can be further reduced. In a case where the first base member 101 is formed by drawing press, it is desirable that the base end regions 101c and 101d are set at positions of respective portions of the first base member 101, the positions which are close to respective drawing points (drawing points 101a and 101b of FIG. 9) at which strengths are relatively high. In this case, the first base member 101 includes the drawing portions (the portions corresponding to the drawing points 101a and 101b) at portions which are at an outer side relative to the space portion 103f (the entering space) and are adjacent to the extended pieces 103c and 103d. The drawing portions correspond to "the drawing points" of the invention. As a consequence, it is effective to further enhance the strength of the first load receiving portion 103 configured as the plate portion including the arch shape.

At the first load receiving portion 103, the space portion 103g may be omitted, and the extended piece 103d and the extended piece 103e may be integrated with each other to configure an extended piece. According to this configuration, the first load receiving portion 103 is the plate portion formed in the arch shape including the two extended pieces (that is, the extended piece 103c, and the extended piece formed by the extended piece 103d and the extended piece 103e which are integrated with each other).

According to the first load receiving portion 103 including the above-described configuration, due to the structure in which the base main body portion 102 of the first base member 101 is extended towards the second base member 104, it can counteract or oppose to the load received from the striker 20. In the embodiment, it is configured such that the plate thickness of the first base member 101 exceeds the plate thickness of the second base member 104, and that the strength of the first load receiving portion 103 exceeds strength of the second base member 104. Accordingly, as FIG. 10 is referred to, for example, in a case where the striker 20 moves from a position indicated with a long dashed double-short dashed line to a position indicated with a solid line, the connection piece 103a of the first load receiving portion 103 of which the strength is relatively high has priority in being in contact with the striker 20 at the inner wall surface 103b, and thereby receiving the input load in a direction of an outlined arrow. In this case, the input load from the striker 20 is dispersed first by the first load receiving portion 103, and thus the input load can be prevented from extending to the second load receiving portion 104c. Or even in a case where the first load receiving portion 103 is deformed by the input load from the striker 20 and the load extends to the second load receiving portion 104c from the striker 20, a level of the load can be reduced low. As a result, the second base member 104 including the second load receiving portion 104c can be down-sized without decreasing the strength against the striker 20, and accordingly weight reduction and cost reduction of the door latch apparatus 100 become possible.

According to the door latch apparatus 100 including the above-described configuration, the first load receiving portion 103 of the first base member 101 and the second load receiving portion 104c of the second base member 104 are not connected to each other, and each of the load receiving portions is configured to face the striker 20 that is in a state of having entered into the striker receiving groove 113. According to the configuration, a structure for connecting the first load receiving portion 103 and the second load receiving portion 104c to each other is not required, and thus the second base member 104 is easily assembled on the first base member 101. In addition, it is also advantageous in the weight reduction. Instead of this configuration, in a case where a configuration in which the first load receiving portion 103 and the second load receiving portion 104c are connected to each other is applied, it is advantageous in enhancing the strength against the input load from the striker 20.

For example, the configuration of the first load receiving portion 103 may be modified to the configuration referred to in FIGS. 11 to 14, if needed. In these drawings, component elements of the first load receiving portion 103 are designated by the same reference numbers, and explanation on the same component elements will be omitted.

Figure 11:
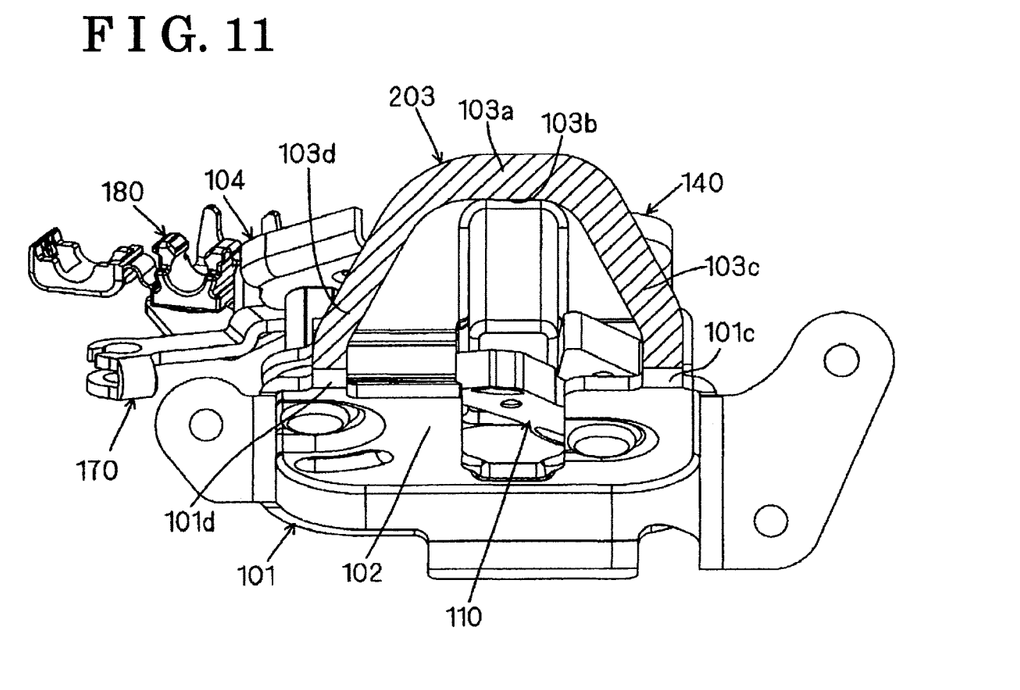
FIG. 11 is a diagram for explaining a configuration of a first load receiving portion 203 related to a modification example of the first load receiving portion 103 of FIG. 9.
Figure 12:
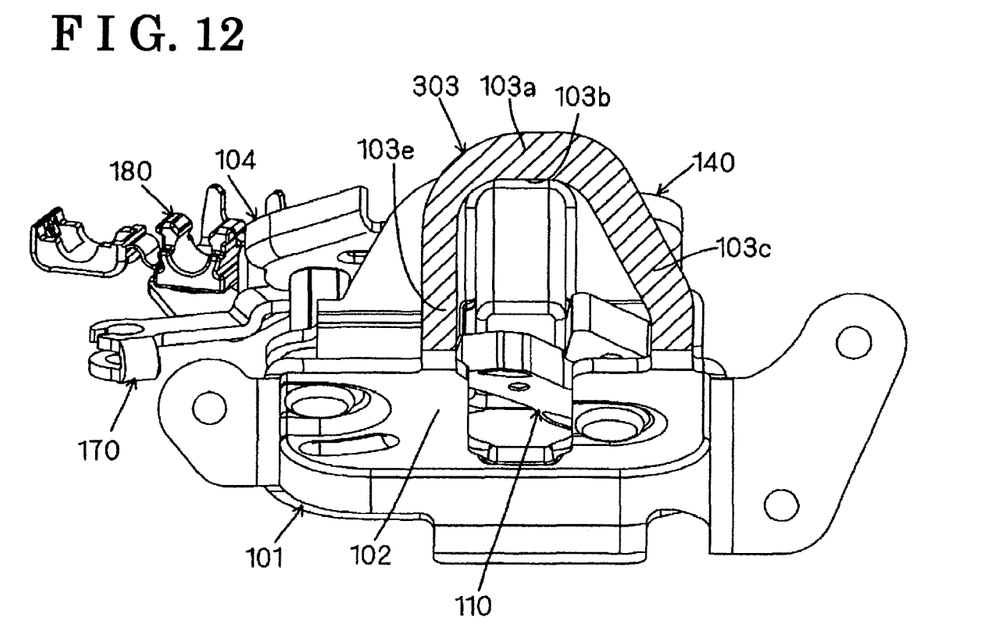
FIG. 12 is a diagram for explaining a configuration of a first load receiving portion 303 related to another modification example of the first load receiving portion 103 of FIG. 9.
Figure 13:
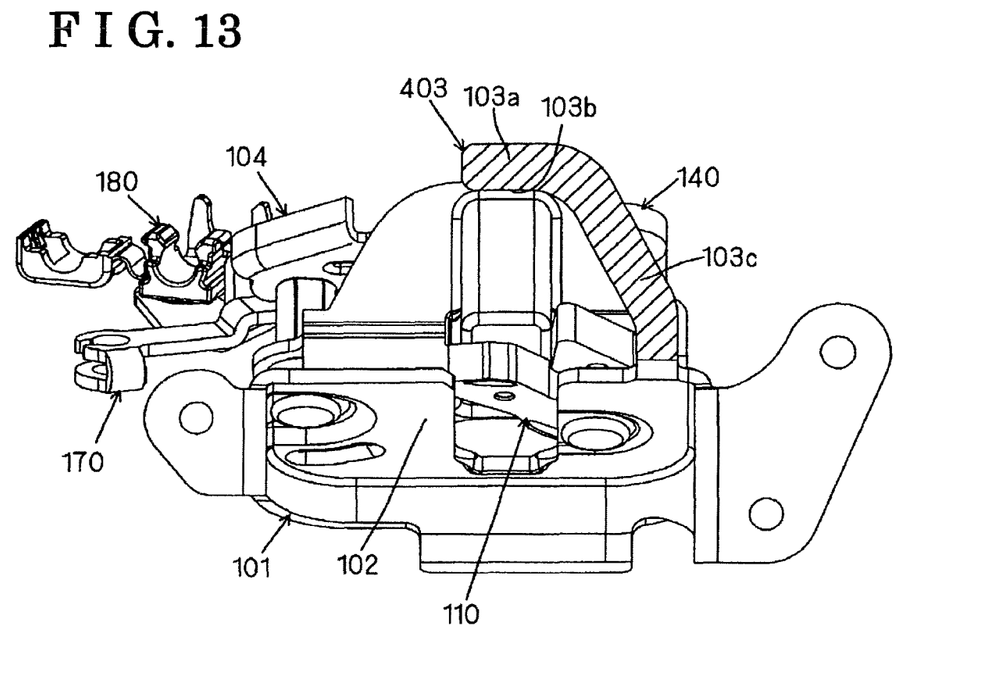
FIG. 13 is a diagram for explaining a configuration of a first load receiving portion 403 related to another modification example of the first load receiving portion 103 of FIG. 9.
Figure 14:
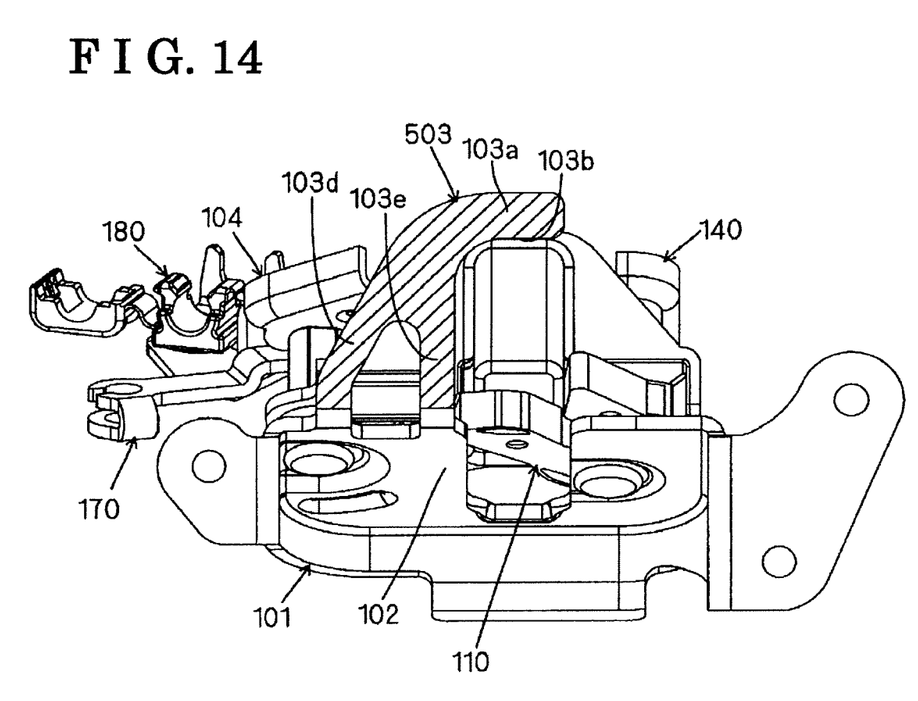
FIG. 14 is a diagram for explaining a configuration of a first load receiving portion 503 related to another modification example of the first load receiving portion 103 of FIG. 9.

A first load receiving portion 203 illustrated in FIG. 11 includes a configuration in which one of the extended pieces, that is, the extended piece 103e, is omitted from the component elements of the first load receiving portion 103. A first load receiving portion 303 illustrated in FIG. 12 includes a configuration in which one of the extended pieces, that is, the extended piece 103d, is omitted from the component elements of the first load receiving portion 103. A first load receiving portion 403 illustrated in FIG. 13 includes a configuration in which two of the extended pieces, that is, the extended pieces 103d and 103e, are omitted from the component elements of the first load receiving portion 103. A first load receiving portion 503 illustrated in FIG. 14 includes a configuration in which one of the extended pieces, that is, the extended piece 103c, is omitted from the component elements of the first load receiving portion 103. That is, the first load receiving portion according to the invention is sufficient as long as the first load receiving portion includes an element which receives the load from the striker 20, and at least another element which connects the aforementioned element to the base main body portion 102. According to the first load receiving portions 203, 303, 403 and 503 of the modification examples, the weight can be reduced compared to the first load receiving portion 103.

The invention is not limited to the above-described typical embodiment and various applications and/or modifications can be considered. For example, the following embodiments to which the above-described embodiment is applied can be implemented.

In the invention, the shapes and configurations of the first load receiving portions 103 to 503 are not limited to the above-described embodiments and may be changed or modified in various ways if needed. For example, instead of the plate shape, the first load receiving portion may be formed in a rod shape or a bar shape which includes a cross section of a circular shape, an oval shape, a quadrate shape, a polygonal shape, or the like. At the first load receiving portion 103 illustrated in FIG. 9, the case in which the length of the connection piece 103a is below the distance between the base end region 101c of the extended piece 103c and the base end region 101d of the extended piece 103d. According to the invention, however, a configuration in which the length of the connection piece 103a is a similar extent to the distance between the base end region 101c and the base end region 101d of the extended piece 103d, and/or a configuration in which the length of the connection piece 103a exceeds the distance between the base end region 101c and the base end region 101d of the extended piece 103d can be applied.

According to the above-described embodiment, the case is described in which the first load receiving portion 103 to 503 of the first base member 101 comes into contact with the striker 20 prior to the second load receiving portion 104c of the second base member 104. However, according to the invention, a configuration in which the first load receiving portion comes into contact with the striker at the same timing as the second load receiving portion and/or a configuration in which the second load receiving portion comes into contact with the striker prior to the first load receiving portion can be applied.

In the invention, the first load receiving portion 103 may form a part of the first base member 101 or may be a separate member joined to the first base member 101 by, for example, welding.

In the above-described embodiment, the first load receiving portion is configured by the portion extended from the first base member 101 towards the second base member 104, however, according to the invention, the first load receiving portion may be configured by a portion extended from the second base member 104 towards the first base member 101.

In the above-described embodiment, the door latch apparatus 100 mounted on the vehicle door 10 of the sliding type which corresponds to the vehicle rear seat is described, however, according to the invention, the essential configuration of the door latch apparatus 100 is applicable to a door for a vehicle which is provided at other portion of a vehicle.

The invention claimed is:

1. A door latch apparatus for a door for a vehicle, the door latch apparatus comprising:
 a first base member made of metal and including a striker receiving groove configured such that a striker enters into the striker receiving groove in a striker entering direction;
 a latch configured to be rotatable in two directions about a latch rotary shaft attached to the first base member, the two directions corresponding to an engagement direction in which the latch engages with the striker and a disengagement direction in which the latch disengages from the striker;
 a second base member made of metal and arranged to face the first base member with the latch interposed therebetween, the second base member being fixed to the first base member; and
 a first load receiving portion extended from one of the first base member and the second base member towards an other of the first base member and the second base member, and a second load receiving portion provided at the other of the first base member and the second base member, wherein
 the first load receiving portion and the second load receiving portion are arranged, in a case where the striker, having entered into the striker receiving groove, is biased towards the second base member, to directly contact the striker from a direction that is different from the striker entering direction and receive an input load from the striker.

2. The door latch apparatus for the door for the vehicle according to claim 1, wherein the first load receiving portion and the second load receiving portion are not directly connected to each other.

3. The door latch apparatus for the door for the vehicle according to claim 1, wherein the one of the first base member and the second base member is the first base member, the other of the first base member and the second base member is the second base member, strength of the first load receiving portion exceeds strength of the second load receiving portion, and the striker comes into direct contact with the first load receiving portion prior to the second load receiving portion in the case where the striker, having entered into the striker receiving groove, is biased towards the second base member.

4. The door latch apparatus for the door for the vehicle according to claim 3, wherein the first load receiving portion is configured as a plate portion formed in an arch shape and including two extended pieces which are extended respectively from two different base end regions of the first base member and define an entering space for the striker, and a connection piece connecting extended ends of the respective two extended pieces to each other.

5. The door latch apparatus for the door for the vehicle according to claim 4, wherein the first base member includes a drawing portion at a portion which is at an outer side of the entering space and is adjacent to the extended piece.

6. The door latch apparatus for the door for the vehicle according to claim 4, wherein the first load receiving portion is configured to extend along a panel-extended-surface of a vehicle body panel at which the door for the vehicle is fitted in a case where the door for the vehicle is closed.

* * * * *